A. W. LIVINGSTON.
VEHICLE WHEEL.
APPLICATION FILED SEPT. 25, 1911.

1,065,537.

Patented June 24, 1913.

2 SHEETS—SHEET 1.

Witnesses
H. A. Stock.
F. P. Schroeder.

Inventor
ANDREW W. LIVINGSTON

By Harry C. Schroeder
his Attorney

A. W. LIVINGSTON.
VEHICLE WHEEL.
APPLICATION FILED SEPT. 25, 1911.

1,065,537.

Patented June 24, 1913.

2 SHEETS—SHEET 2.

Witnesses
H. A. Stock
F. P. Schroeder

Inventor
ANDREW W. LIVINGSTON

By Harry C. Schroeder
Attorney

UNITED STATES PATENT OFFICE.

ANDREW W. LIVINGSTON, OF OAKLAND, CALIFORNIA, ASSIGNOR TO STANDARD STEEL WHEEL AND TIRE ARMOR COMPANY, OF OAKLAND, CALIFORNIA, A CORPORATION OF ARIZONA.

VEHICLE-WHEEL.

1,065,537.    Specification of Letters Patent.    Patented June 24, 1913.

REISSUED

Application filed September 25, 1911. Serial No. 651,200.

*To all whom it may concern:*

Be it known that I, ANDREW W. LIVINGSTON, a citizen of the United States, residing at Oakland, in the county of Alameda and State of California, have invented certain new and useful Improvements in Vehicle-Wheels, of which the following is a specification.

This invention relates to improvements in vehicle wheels and has for its object the production of a device which is formed from a single piece of material which is so formed as to possess great strength and resistance against the dishing of a wheel that is to say the buckling thereof.

Another object of this invention is the production of a vehicle wheel which is provided with a body portion formed from a single piece of material, and bent so as to reinforce the same, and also to form efficient rim engaging means.

With these and other objects in view this invention consists of certain novel constructions, combinations, and arrangements of parts, as will be hereinafter fully described and claimed.

Figure 1:
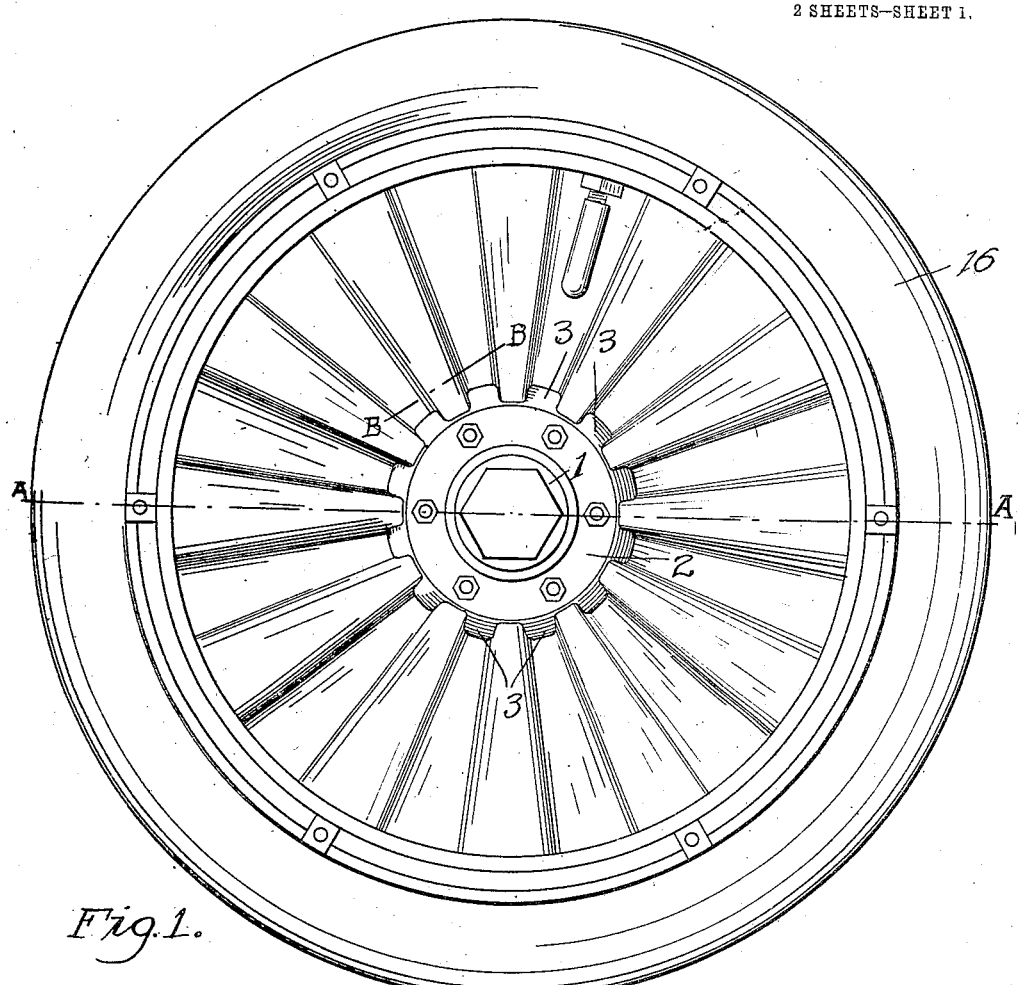
Figure 2:
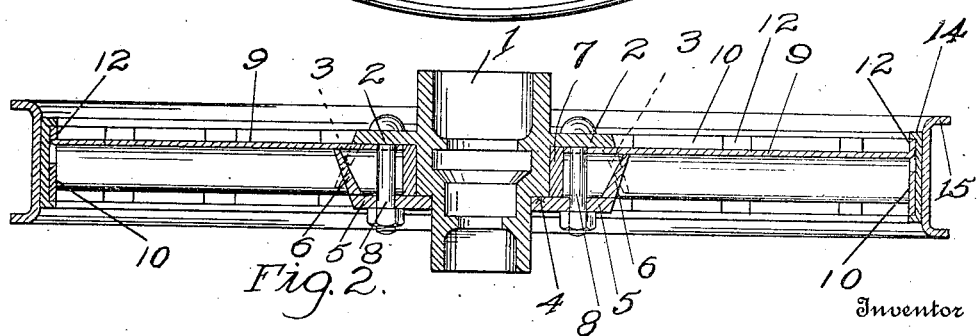
Figure 3:
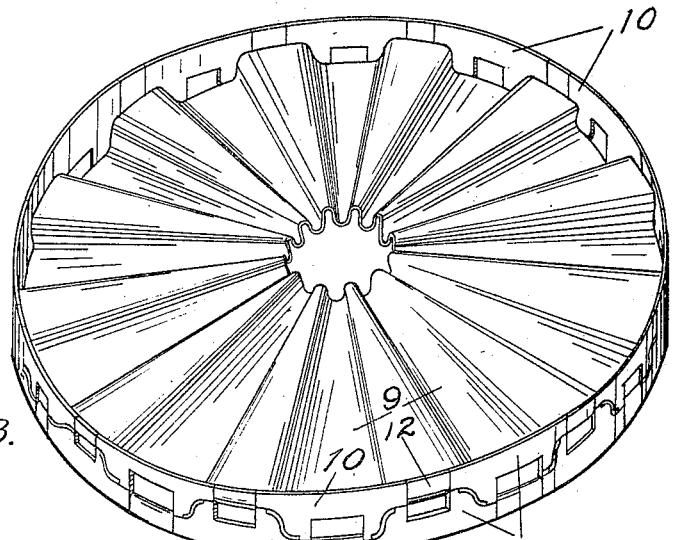
Figure 4:
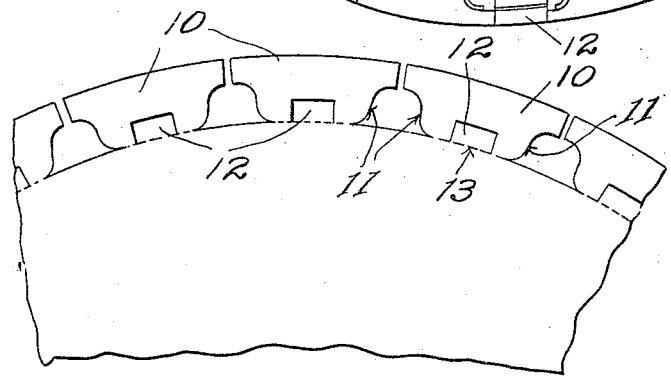
Figure 5:
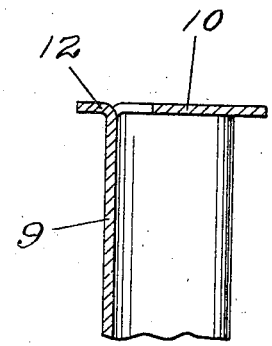
Figure 6:
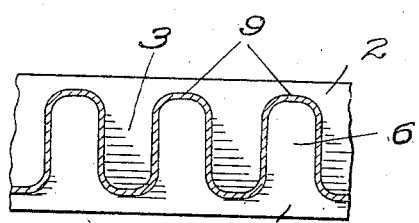

In the drawings: Figure 1 is a side elevation of the vehicle wheel. Fig. 2 is a transverse section taken on line A—A of Fig. 1. Fig. 3 is a perspective view of the body portion of the wheel detached from the rim and hub. Fig. 4 is a fragmentary plan view of a portion of the blank from which the body portion of the wheel is bent. Fig. 5 is a fragmentary sectional view of the body portion of the wheel showing how the rim engaging portions are bent thereon. Fig. 6 is a section taken on line B—B of Fig. 1.

Referring to the drawings by numerals 1 designates the hub which is provided intermediate its ends with a flange 2 having projecting laterally therefrom a plurality of fingers 3. The hub 1 is provided near one end with a shoulder 4 against which fits a hub-plate 5, which hub-plate like the flange 2 is provided with a plurality of fingers 6. A spacing collar 7 is positioned between the flange 2 and the plate 5, and said flange and plate are firmly held in a set position through the medium of the clamping bolts 8.

The body portion of the wheel is formed from a blank sheet which is corrugated thereby constituting ribs 9. The fingers 3 and 6 fit in the dished portions of the corrugations thereby greatly strengthening the same at the junction of the body with the hub. In this way the body portion of the wheel will also be firmly locked in engagement with the hub.

The body portion is first formed from a blank sheet as illustrated in Fig. 4 having the edge thereof cut to form feet 10 which are scalloped on their ends as at 11 so as to conform to the shape of the corrugations when bent as illustrated in Fig. 3. A lip 12 is cut from the center of each foot 10, and is bent on the line 13, in an opposite direction to the foot 10. It will be obvious that as the corrugations fit snugly against the sides 11 of the feet 10, these corrugations will be greatly reinforced at their outer end thereby constituting a substantially rigid frame or body portion formed from a cheap and easily manufactured blank. It will, of course, be obvious that these feet 10 are alternately bent in opposite directions so as to accommodate the shape of the corrugations. This feature is clearly illustrated in Fig. 3 of the drawings.

The lip 12 and the foot 10 are secured to a channel band 14 which is shrunk upon the outer edge of the body of the wheel in any suitable manner. This channel band is connected to a rim 15 of any suitable construction for the reception of the ordinary tire 16.

From the foregoing description, it will be readily obvious that the entire device may be stamped from sheet metal owing to the fact that it is not necessary to provide any separate means for connecting the outer edge of the body with the rim.

What is claimed is:—

A spoke structure for a wheel provided with radial corrugations, the convolutions forming the corrugations being of substantially the same depth from the center to the periphery of the spoke structure.

In testimony whereof I affix my signature in presence of two witnesses.

ANDREW W. LIVINGSTON.

Witnesses:
 JOSEPH M. BENHAM,
 W. A. STOCK.